Figure 1:
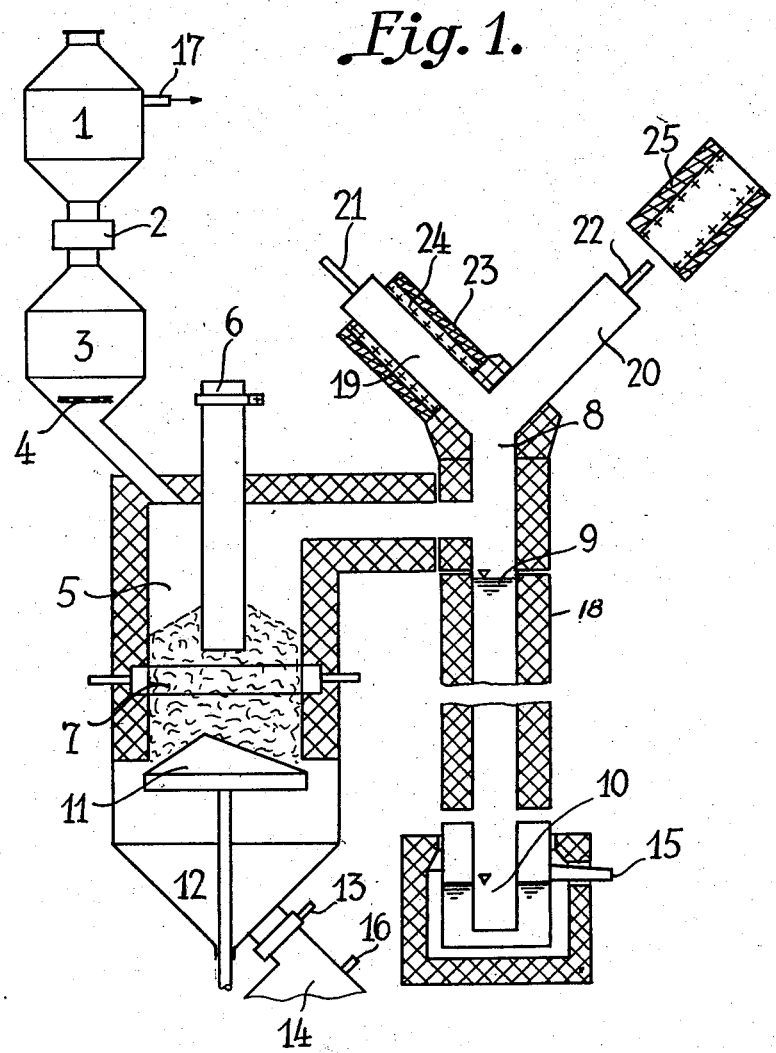

WILHELM MOSCHEL, deceased
OTTO BRETSCHNEIDER
INVENTORS

Aug. 12, 1958    O. BRETSCHNEIDER ET AL    2,847,295
PROCESS AND APPARATUS FOR THE ELECTRO-THERMAL
PRODUCTION OF MAGNESIUM
Filed Dec. 13, 1954            2 Sheets-Sheet 2
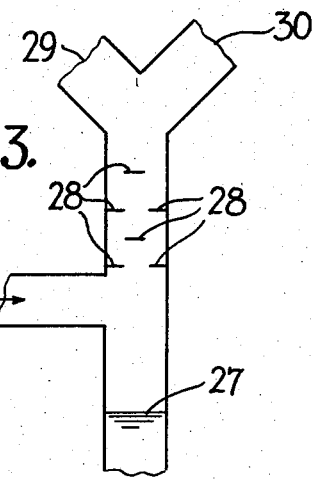
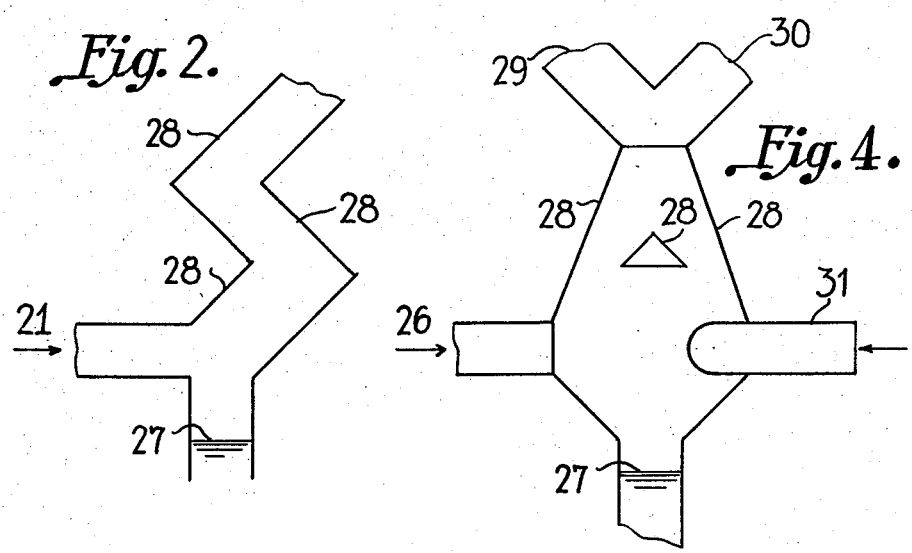
WILHELM MOSCHEL, deceased
OTTO BRETSCHNEIDER
       INVENTORS
BY Connolly and Hutz
ATTORNEYS

United States Patent Office 2,847,295
Patented Aug. 12, 1958

2,847,295

PROCESS AND APPARATUS FOR THE ELECTROTHERMAL PRODUCTION OF MAGNESIUM

Otto Bretschneider, Knapsack, near Koln, Germany, and Wilhelm Moschel, deceased, late of Leverkusen, near Koln, Germany, by Hedwig Moschel geb. Gilcher, widow, Leverkusen, Brigitte Carstensen geb. Moschel, Jugenheim, Bergstrasse, and Renate Moschel and Albrecht Moschel, Leverkusen, Germany, heirs, assignors to Knapsack-Griesheim Aktiengesellschaft, Knapsack, near Koln, Germany, a corporation of Germany Application December 13, 1954, Serial No. 474,948

Claims priority, application Germany December 19, 1953

13 Claims. (Cl. 75—10)

The production of magnesium by reduction of magnesium oxide, or of substances containing magnesium oxide, with reducing agents at a high temperature is already known. Especially those processes have been carried out industrially in which are used, as reducing agents, substances producing no volatile reaction products apart from magnesium vapor. Frequently in such cases reduced pressure was applied as the reaction temperature is then considerably lower than under normal pressure conditions.

The principal obstacle which has to be faced in the technical performance of most of the hitherto known processes is the poor thermal conductivity of the reaction mass and the consequent problem of the heating of the reaction material up to the required high reaction temperature within the short period necessary for a good yield per unit and time. Owing to the poor thermal conductivity of the reaction material which, in the processes hitherto applied, consists for the most part of oxidic compounds, it was only possible to heat through a layer of a few centimeters thickness. Consequently, only retorts of a small diameter were used when heat was supplied by external heating. For large-scale productions a great number of production units is necessary, the limited capacity of which—together with waste of material and time—render the process uneconomic compared with the electrolytical process. The construction of rotating cylinder roasters resulted in a larger amount of production units. In these rotating cylinder roasters the reaction mixture was usually applied in the form of briquettes under an axially arranged heating element which served as source of radiation. Though the steady renewal of the surface of the reaction material allowed a constant heating the ratio of introduced energy to the reaction space, the density of energy, remained unsatisfactory also with this arrangement, and the special advantage of the thermal process was only insufficiently utilized.

Also the transmission of heat by the arrangement of a bath heated inductively or by Joule heat and consisting of liquid metal or of liquid slag, on which reaction material is applied, does not result in a satisfactory technical solution of the problem. On the one hand, the efficiency of such an arrangement naturally depends on the surface of the liquid bath, on the other hand, this mode of process involves the danger of a premature melting of the reaction material, whereby for instance in the silico-thermal reduction process the reaction is deprived of valuable reducing agents and magnesium oxide by the formation of magnesium silicates. The development of a larger unit with a high capacity is hindered by the comparatively narrow limitation of a fusible bath surface and the low level of the solid reaction material floating on the surface.

The direct supply of energy to the reaction material in form of Joule heat has so far not been carried out on an industrial scale, as the hitherto usual stoichiometric composition of the reaction material showed only a very slight electrical conductivity, which, moreover, diminished further as a result of the decrease of the metallic component in the course of the reaction, so that the only way of supplying Joule heat was that by means of liquid slag, which, however, has the above mentioned drawbacks.

Now, we have found a process which, for the first time, enables the supply of Joule heat to the reaction material itself and in which, on a very limited space, the reduction is carried out within the shortest time without being interrupted by the appearance of a liquid phase.

According to the present invention, this process can be achieved by applying the metallic reduction material in a surplus exceeding the theoretically necessary amount to such an extent that the reaction material which suitably is converted into shaped bodies maintains an almost metallic conductivity until the end of the reaction, i. e. a conductivity which corresponds to an electrical resistance of a centimeter cube equal to about 1 to about 6 milliohms, whereby the supply of electrical energy into the material itself is possible in a definite and adjustable manner, either by resistance heating or by inductive heating.

It proved to be of special advantage to formulate the reaction components by adjusting the fineness of grinding in such a way, that the component containing magnesium oxide, for instance dolomite, does not exceed a particle size of $150\mu$ and the metallic component, for instance ferrosilicon, does not exceed a particle size of about $50\mu$. When carrying out the process of the invention the particle size can generally be chosen in such a manner, that the component containing magnesium oxide is between about $5\mu$ and about $150\mu$, while the metal component lies between about $5\mu$ and about $50\mu$.

As starting material magnesium oxide and especially calcined burned dolomite in the form of powder is used, which may be molded into shaped bodies. However, any other MgO-containing starting materials are applicable, for example, also serpentine, besides the cited substances.

In addition to aluminium and silico-aluminium, there can be used FeSi-alloys, Al-Fe-Si-alloys and calcium silicide alloys as metallic reduction material.

Furthermore, it was found that the amount of the surplus of the reduction material to be chosen, according to the present invention, depends on the type and quality of the metallic reduction material used in this case. It proved to be of advantage to choose the surplus of the component acting as reduction material at least in such an amount that compounds or alloys, appearing with accompanying metals and diminishing the reaction capability of the reduction material—as for instance the compound FeSi in cases when ferrosilicon is used as reduction material—will remain after the reaction has been completed. Thus, during the reaction the available reduction material will be completely utilized at optimum reaction velocity.

Approximately double the quantity of reduction material of minimum value is considered the maximum limit of the surplus amounts of the metallic reduction material. For instance, when using ferrosilicon, a minimum surplus of such an amount is considered applicable that—after a complete reduction of the entire quantity of MgO by Si, the chemical compound FeSi will be left over in the remaining residue, i. e. a ferrosilicon alloy of a Si content of 33%. As maximum value for the surplus an amount will be applied in which remains a ferrosilicon alloy of a Si-content of 66% in the completely reacted residue. The Si-surplus can be expressed in percentages only for each particular applied ferrosilicon alloy of a certain Si-content.

When a ferrosilicon of 75% strength is used as raw material the minimum Si-surplus will be 20% of the theoretically required amount of silicon in order to obtain, after the Mg-development, a ferrosilicon alloy containing 33% of Si=FeSi from the remaining iron and the Si-surplus.

The determination of these figures is possible by establishing the Fe content of the ferrosilicon applied. For instance, if a ferrosilicon of 75% strength is concerned, an amount of 75 kg. of Si+25 kg. of Fe has to be calculated for 100 kg. of material. This amount of 25 kg. of Fe requires 12.5 kg. of Si for the formation of FeSi. Consequently, only 62.5 kg. of Si will be available for the reduction of the MgO. Of these 62.5 kg. of Si, 12.5 kg.=20% represent the surplus of the theoretically required amount of Si. In order to obtain in the residue an alloy of 66% Si from the FeSi of 75% strength, the required maximum surplus amount in this case is 200% Si.

The following examples serve to illustrate the invention, but they are not intended to limit it thereto:

Example 1

100 kg. of burned dolomite powder, having a content of 38% of MgO, and 26.5 kg. of finely ground ferrosilicon having a content of 75% Si, are thoroughly mixed and moulded into shaped bodies. The shaped mixture, by means of a vacuum conduit, is continuously introduced into a shaft-furnace evacuated to less than 20 mm. Hg pressure by passing through a heating zone. In this zone the electrical current is led to the passing mixture by two opposite graphite electrodes, whereby the material which assumes the role of electrical conductor is heated to the required temperature of about 1400° C. The resulting magnesium vapor escapes into the condenser attached to the furnace, where it is condensed to 23 kg. of metal. The yield of magnesium corresponds to the theoretical yield. After the reaction is complete the not yet molten mixture leaves the pit-shaped furnace below the heating zone and leaves the apparatus by passing through a cooling system and a vacuum conduit. The above amount yields 103 kg. of residues containing 13% of ferrosilicon of 50% strength. The unreacted ferrosilicon will be recovered by flotation or by a complete melting of the residue.

Example 2

100 kg. of burned dolomite having a content of 38% of MgO, and 39.8 kg. of an alloy containing 30% of Al, 40% of Si and 30% of Fe, are mixed in powdered form and are introduced, as briquetted material, through vacuum conduits into the evacuated furnace, in which the electrical current is directly conducted through the reaction mixture. The material reaches the reaction temperature of about 1400° C. by a direct resistance heating, whereby vaporous magnesium is developed. The vapor is precipitated in the condenser and yields 23 kg. of magnesium. The yield of magnesium corresponds to the theoretical yield. The above amount of reacted material yields 113.8 kg. of completely reacted residue, which leaves the furnace in the above mentioned way. The residue contains 20.6% of ferrosilicon of 50% strength, which is recovered by wet mill treatment or by a treatment in a molten state.

The process according to the present invention can be carried out at normal pressure in an indifferent atmosphere, for instance in a hydrogen or rare inert gas atmosphere. It is of special advantage to carry out the process under reduced pressure.

In this procedure the low pressure prevailing in the apparatus does not exceed 20 mm. of Hg. The process is generally carried out under a pressure of about 1 mm. For furnaces of that kind, vacua of 0.1 mm. are the practical limit.

In addition to the known advantages of lower working temperature the present process offers the special advantage of reducing the electrical transfer resistance between electrodes and reaction material and within the reaction material itself, which is mostly applied in form of shaped granules.

The residue remaining after the reaction can be discharged either in a solid or in a liquid form. In case of the liquid discharge care has to be taken that only after the reaction is complete the liquefaction is brought about at about 1600° C.–1800° C. by a subsequent heating of the reaction residue. This is suitably done by carrying out the subsequent heating in a zone of the reduction furnace which is sufficiently separated from the reaction zone.

For the purpose of discharging the residue in a liquid state, the material will be molten by an additional heating in the extended shaft below the reaction zone. The liquefaction of the residue does not occur before the point where the development of the vaporous magnesium ceases. The space between the melting zone and the reaction zone differs according to the electrical charge and the material reacted in unit time.

According to the present process the surplus reducing agent is recovered from the remaining reaction residue by wetmill treatment or in the liquid phase, and is either used as such, for instance in the form of ferrosilicon of 50% strength, or it is returned in a cycle into the process, thus yielding a high percentage ferrosilicon.

The present procedure can be carried out either discontinuously, or, with special advantage, in a continuous method of operation, by applying the known principles of continuous feeding and discharging.

The process, according to the present invention, represents a considerable technical improvement compared with the hitherto known processes of the thermal production of magnesium by reduction with metallic reducing agents, inasmuch as it is possible for the first time to carry out this process with high energy density and yield per unit of volume and time, and to operate reduction furnaces on a large scale with a capacity exceeding by far the hitherto known outputs. Moreover, the new process consists of discharging continuously the produced magnesium in a liquid state from the evacuated apparatus by way of a heated, barometrical column consisting of liquefied magnesium. Furthermore, in the new process two or more condensers, connected in parallel, are mounted after the condenser for the liquid magnesium in which, by turns, the last remainder of magnesium vapor is condensed into solid form, whereby one or more condensers are kept at 20 to 500° while at the same time one or more condensers are kept at a temperature exceeding the melting point of magnesium, for instance at 650 to 700° C., and whereby the liquefied metal flows off to the major part of the output.

Moreover, the invention comprises the mounting of baffles, onto which the magnesium vapor stream strikes. The baffles are arranged within or before the condensers; the magnesium vapor then either condenses at said baffles or within the provided condensation zone to which it has flown back.

In this process, the ratio of condensation zone to the amount of magnesium condensed within unit time, herein designated as condensation density, should not exceed the value of 20 m.$^2$ per ton of magnesium per hour.

For complete continuity under vacuum the entire amount of the produced magnesium has to be continuously removed in a liquid form from a barometrical column consisting of molten magnesium. The vapor pressure of the liquefied magnesium being already 2.5 mm. mercury column at the melting point of the magnesium metal, it is impossible, as is already known, to condense the entire amount of magnesium vapor under vacuum in a liquid form. Consequently, a small remaining amount of magnesium vapor will deposit in a solid state in the conduit system leading to the vacuum pump and adjoining the condenser of the magnesium in liquid state—designated as "liquid condenser"—thus resulting in obstructions.

Normally, a cold condenser is mounted behind each liquid condenser, which, therefore, has to be emptied in a discontinuous manner at certain intervals of time.

Suitablly two or more condensers in which the last remainder of the magnesium vapor is precipitated are mounted behind the liquid condenser. In order to carry out the condensation in a continuous manner at least two condensers, connected in parallel, are necessary behind the liquid condenser so that, in turns, one condenser can act as cold condenser at 20 to 500° C., while the other condenser is brought to the melting temperature of magnesium, thus enabling the liquefied magnesium metal to drop off to the major amount.

An apparatus for carrying out the present process is diagrammatically illustrated in the accompanying drawings:

The apparatus is under constant vacuum and operates in a completely continuous way. The addition of reaction material is carried out according to the principle of double charging valves. In a vessel 1 there is admitted air with closed valves 2 and reaction material is filled in. After closing and evacuating the vessel 1 valve 2 is opened and the material is admitted into the vessel 3. From there the reaction material passes a supplier 4 and runs into the reaction space 5, where it is heated by direct current. The current is admitted by one or more electrodes 6 and carried away, for instance, by a ring-shaped electrode 7.

The magnesium vapor which has developed is passed into the condenser 8 where it is condensed into liquid metal and runs into the barometric column 18 consisting of liquid magnesium. The barometric column which is between 9 and 10 is maintained at 650–700° C., so that the metal added from above can flow off through the exit 15, after having passed the sump formed at 10.

The reaction mixture leaves the apparatus in a solid condition by passing a revolving grate 11 and drops into the store room 12. As soon as this store room is about halfway filled, the valve 13 is opened and the reaction material is admitted into the container 14 which was evacuated previously and of which the drawing shows only the upper part. With valve 13 closed air is admitted into the container 14 and the content is discharged from the lower part of the container. The connecting pieces 16 and 17 lead to a vacuum pump which is not shown in the drawing. Above the liquid condenser 8 there are the two condensers 19 and 20, connected in parallel. Both are connected to the vacuum pump with supply lines 21 and 22. According to Figure 1 the condenser 20 operates as a cold condenser, in which the remaining parts of magnesium vapor are condensed. The condenser 19 is surrounded by heat-insulating coating 23 which can be equipped with additional heating means 24. By this arrangement it is possible to raise the temperature at the condenser 19 beyond the melting point of the magnesium, so that the liquid magnesium metal can flow off from condenser 19 into the liquid condenser 8.

As soon as the condenser 20 has been charged with magnesium, the condenser 19, by removing the cover 23 with the heating means 24, must be cooled down so that the cold condensation can be conducted to the condenser 19. At the same time the temperature at the condenser 20 is raised in the same way as just described for condenser 19, i. e. by removing the cover 25 and putting it onto condenser 20. The diversion of the magnesium vapors from one to the other of the two condensers 19 or 20 is accomplished by respectively opening or blocking the pipe line 21 or 22 leading to the vacuum pump. For the regulation of the temperature in the liquid condenser 8 the heat-insulating covers 23 and 25 surrounding the condenser are constructed in such a manner that they can be taken off in parts or completely, according to requirements.

Should it turn out that, according to the capacity of the furnace, the condensers 19 and 20 are not sufficient, further condensers can be mounted.

Furthermore, it has proved to be of advantage to block the way of the magnesium vapor by baffles, as under vacuum the laminar flow is extremely high. This construction obstructs the quick impact of the magnesium vapor into the provided condensation zone. By mounting baffles, the laminar flow, for the most part, can be changed into a turbulent flow which favors a quick, satisfactory condensation of the vapors in the provided condensation zone.

Figures 2–4 show that method of operation. 26 presents the point of entrance of the magnesium vapor; 27 is the surface of the barometric column consisting of liquid magnesium and 28 represents the baffles. At point 29 and 30 the condensers 19 and 20 respectively are attached.

Part 31 of the Figure 4 represents a liquid condenser through which a cooling agent flows and by which the main portion of the magnesium vapor is condensed, whereas the baffles 28 in the equipment according to Figure 4 are maintained at a temperature which does not allow condensation of the magnesium vapor. The temperature is determined by the pressure of magnesium vapor prevailing in the condenser and by the curve of the vapor pressure of the liquid magnesium (which is known from the literature).

The ratio of the condensation zone to the amount of magnesium condensed per unit of time is of importance for the condensation of the magnesium vapors; this ratio is defined as condensation density. It is of advantage to operate according to the present invention at maximum condensation densities, for instance at about 10 m.$^2$ per ton of magnesium per hour. A condensation density of 20 m.$^2$ per ton of magnesium per hour is generally the utmost limit for a satisfactory condensation. If this condensation density is increased beyond the value stated before, the portion of coagulating metal drops, the so-called waste metal, will be considerably increased.

This, in the first place, is due to the fact that the slightest amount of oxygen-containing gases reacts with magnesium, forming a thin oxide layer on the small magnesium drops, thus hindering the formation of a uniform melt. If a large condensation zone is concerned, a great amount of small drops develop while bigger drops form in the case of a small condensation zone.

We claim:

1. A process for the electro-thermal production of magnesium which comprises the steps of introducing a finely-divided substance selected from the group consisting of magnesium oxide, burned dolomite and serpentine together with a finely-divided metallic reducing agent, the metallic reducing agent yielding under reducing conditions non-volatile reaction products, heating the material to reduction temperature and evolving magnesium vapor, condensing a major portion of the magnesium vapor in a first condensing zone to form molten magnesium, ultimately condensing the remaining magnesium vapor in one of several condensing zones to form solid magnesium while heating another condensing zone containing previously solidified magnesium to form further molten magnesium and continuously withdrawing molten magnesium product.

2. A process for the electro-thermal production of magnesium which comprises the steps of introducing a finely-divided substance selected from the group consisting of magnesium oxide, burned dolomite and serpentine together with a finely-divided metallic reducing agent, the metallic reducing agent yielding under reducing conditions nonvolatile reaction products, heating the material to reduction temperature and evolving magnesium vapor while maintaining residual material in the solid state, tortuously interrupting resulting magnesium vapor stream to obtain a stream of magnesium vapor in turbulent flow, condensing turbulently flowing magnesium vapor in at least one condensing zone, and continuously withdrawing molten magnesium product.

3. A process for the electro-thermal production of magnesium which comprises the steps of introducing a finely-divided substance selected from the group consisting of magnesium oxide, burned dolomite and serpentine together with a finely-divided metallic reducing agent, the metallic reducing agent yielding under reducing conditions non-volatile reaction products and being present in a quantity in excess of that stoichiometrically required for reduction of the magnesium oxide introduced, said quantity providing electrical conductivity corresponding to an electrical resistance of a centrimetre cube equal to about 1 to about 6 milliohm throughout reduction, passing an electric current directly through the material so introduced and thereby heating the material to reduction temperature and evolving magnesium vapor while maintaining residual material in the solid state, condensing a major portion of the magnesium vapor in a first condensing zone to form molten magnesium, ultimately condensing the remaining magnesium vapor in one of several condensing zones to form solid magnesium while heating another condensing zone containing previously solidified magnesium to form further molten magnesium and continuously withdrawing molten magnesium product.

4. A process for the electro-thermal production of magnesium which comprises the steps of introducing under vacuum conditions and through a vacuum sealed zone of molten magnesium, a finely-divided substance selected from the group consisting of magnesium oxide, burned dolomite and serpentine together with a finely-divided metallic reducing agent, the metallic reducing agent yielding under reducing conditions non-volatile reaction products and being present in a quantity in excess of that stoichiometrically required for reduction of the magnesium oxide introduced, said quantity providing electrical conductivity throughout reduction, passing an electric current directly through the material so introduced and thereby heating the material to reduction temperature and evolving magnesium vapor while maintaining residual material in the solid state, condensing a major portion of the magnesium vapor in a first condensing zone to form molten magnesium, ultimately condensing the remaining magnesium vapor in one of several condensing zones to form solid magnesium while heating another condensing zone containing previously solidified magnesium to form further molten magnesium and continuously withdrawing molten magnesium product.

5. A process for the electro-thermal production of magnesium which comprises the steps of introducing under vacuum conditions a substance selected from the group consisting of magnesium oxide, burned dolomite and serpentine, the particle size of said substance being from $5\mu$ to about $150\mu$ together with a metallic reducing agent having a particle size of from about $5\mu$ to about $50\mu$ into a reducing zone, the metallic reducing agent yielding under reducing conditions non-volatile reaction products and being present in a quantity in excess of that stoichiometrically required for reduction of the magnesium oxide introduced, said quantity providing electrical conductivity throughout reduction, passing an electric current directly through the material so introduced and thereby heating the material to reduction temperature and evolving magnesium vapor while maintaining residual material in the solid state, condensing a major portion of the magnesium vapor in a first condensing zone to form molten magnesium, ultimately condensing the remaining magnesium vapor in one of several condensing zones to form solid magnesium while heating another condensing zone containing previously solidified magnesium to form further molten magnesium and continuously withdrawing molten magnesium product.

6. A process for the electro-thermal production of magnesium which comprises the steps of introducing under vacuum conditions a substance selected from the group consisting of magnesium oxide, burned dolomite and serpentine, the particle size of said substance being from $5\mu$ to about $150\mu$ together with a metallic reducing agent having a particle size of from about $5\mu$ to about $50\mu$ into a reducing zone, the metallic reducing agent yielding under reducing conditions non-volatile reaction products and being present in a quantity in excess of that stoichiometrically required for reduction of the magnesium oxide introduced, passing an electric current directly through the material so introduced and thereby heating the material to reduction temperature and evolving magnesium vapor while maintaining residual material in the solid state, condensing a major portion of the magnesium vapor in a first condensing zone to form molten magnesium, ultimately condensing the remaining magnesium vapor in one of several condensing zones to form solid magnesium while heating another condensing zone containing previously solidified magnesium to form further molten magnesium and continuously withdrawing molten magnesium product.

7. A process for the electro-thermal production of magnesium which comprises the steps of continuously introducing under vacuum conditions a finely-divided substance selected from the group consisting of magnesium oxide, burned dolomite and serpentine together with a finely-divided metallic reducing agent, the metallic reducing agent yielding under reducing conditions non-volatile reaction products and being present in a quantity in excess of that stoichiometrically required for reduction of the magnesium oxide introduced, said quantity providing electrical conductivity throughout reduction, passing an electric current directly through the material so introduced and thereby heating the material to reduction temperature and evolving magnesium vapor while maintaining residual material in the solid state, condensing a major portion of the magnesium vapor in a first condensing zone to form molten magnesium, ultimately condensing the remaining magnesium vapor in one of several condensing zones to form solid magnesium while heating another condensing zone containing previously solidified magnesium to form further molten magnesium and continuously withdrawing molten magnesium product.

8. A process for the eletcro-thermal production of magnesium which comprises the steps of introducing a finely-divided substance selected from the group consisting of magnesium oxide, burned dolomite and serpentine together with a finely-divided metallic reducing agent, the metallic reducing agent yielding under reducing conditions non-volatile reaction products and being present in a quantity in excess of that stoichiometrically required for reduction of the magnesium oxide introduced, said quantity providing electrical conductivity throughout reduction, passing an electric current directly through the material so introduced and thereby heating the material to reduction temperature and evolving magnesium vapor while maintaining residual material in the solid state, condensing a major portion of the magnesium vapor in a first condensing zone to form molten magnesium, ultimately condensing the remaining magnesium vapor in one of several condensing zones to form solid magnesium while heating another condensing zone containing previously solidified magnesium to form further molten magnesium and continuously withdrawing molten magnesium product.

9. A process for the electro-thermal production of magnesium which comprises the steps of introducing a finely-divided substance selected from the group consisting of magnesium oxide, burned dolomite and serpentine together with a finely-divided metallic reducing agent, the metallic reducing agent yielding under reducing conditions non-volatile reaction products and being present in a quantity in excess of that stoichiometrically required for reduction of the magnesium oxide introduced, said quantity providing electrical conductivity throughout reduction, passing an electric current directly through the material so introduced and thereby heating the material to reduction temperature and evolving magnesium vapor while maintaining residual material in the solid state, tortuously interrupting resulting magnesium vapor stream to obtain a stream of magnesium vapor in turbulent flow, condensing turbulently flowing, magnesium vapor in at least one condensing zone, and continuously withdrawing molten magnesium product.

10. A process for the electro-thermal production of magnesium which comprises the steps of introducing under vacuum conditions a substance selected from the group consisting of magnesium oxide, burned dolomite and serpentine, the particle size of said substance being from $5\mu$ to about $150\mu$ together with a metallic reducing agent having a particle size of from about $5\mu$ to about $50\mu$ into a reducing zone, the metallic reducing agent yielding under reducing conditions non-volatile reaction products and being present in a quantity in excess of that stoichiometrically required for reduction of the magnesium oxide introduced, said quantity providing electrical conductivity corresponding to an electrical resistance of a centimetre cube equal to about 1 to about 6 milliohm throughout reduction, passing an electric current directly through the material so introduced and thereby heating the material to reduction temperature and evolving magnesium vapor while maintaining residual material in the solid state, condensing a major portion of the magnesium vapor in a first condensing zone to form molten magnesium, ultimately condensing the remaining magnesium vapor in one of several condensing zones to form solid magnesium while heating another condensing zone containing previously solidified magnesium to form further molten magnesium, the vapor flow in the first zone of condensation being tortuously interrupted to produce turbulent vapor flow, and continuously withdrawing molten magnesium product through a vacuum-sealing zone of molten magnesium.

11. Apparatus for the electro-thermal production of magnesium comprising a reduction chamber, means for charging said reduction chamber while maintaining the same under vacuum conditions, means associated with said reduction chamber for withdrawal of residual reaction products while maintaining said reaction chamber under vacuum conditions, first condenser means associated with said reduction chamber for receiving and condensing magnesium vapors evolved therefrom, substantially vertically arranged condensing surfaces in said first condenser means directing flow of condensed magnesium downwardly, temperature control means associated with the condensing surfaces of said first condenser for maintaining said condenser surfaces at a temperature providing liquid magnesium condensate, at least two additional condensers connected in parallel with said first condenser and at the upper end thereof, temperature control means associated with said last condensers to maintain condensing surfaces of one of them at a temperature solidifying magnesium vapors while maintaining condensing surfaces of the other at a temperature producing molten magnesium from previously solidified magnesium, and means associated with the lower end of said first condenser means for withdrawal of the downwardly-flowing condensed molten magnesium while maintaining vacuum conditions in said apparatus.

12. Apparatus as set forth in claim 11 wherein said means for withdrawing magnesium from said apparatus comprising a barometric column consisting of liquid magnesium.

13. Apparatus as set forth in claim 11 in which the condensing surfaces of the first condenser means are interrupted to define a tortuous vapor path.

References Cited in the file of this patent

UNITED STATES PATENTS

| | | |
|---|---|---|
| 1,311,378 | Bleeker et al. | July 29, 1919 |
| 2,165,742 | Blackwell et al. | July 11, 1939 |
| 2,432,111 | Loevenstein | Dec. 9, 1947 |
| 2,550,684 | Fouquet | May 1, 1951 |
| 2,570,232 | Hansgirg | Oct. 9, 1951 |
| 2,724,644 | Mathieu | Nov. 22, 1955 |